March 3, 1942.           D. W. GRIFFIN           2,274,689
                    HYDROMETRIC GAUGING CUP
                      Filed Oct. 23, 1940
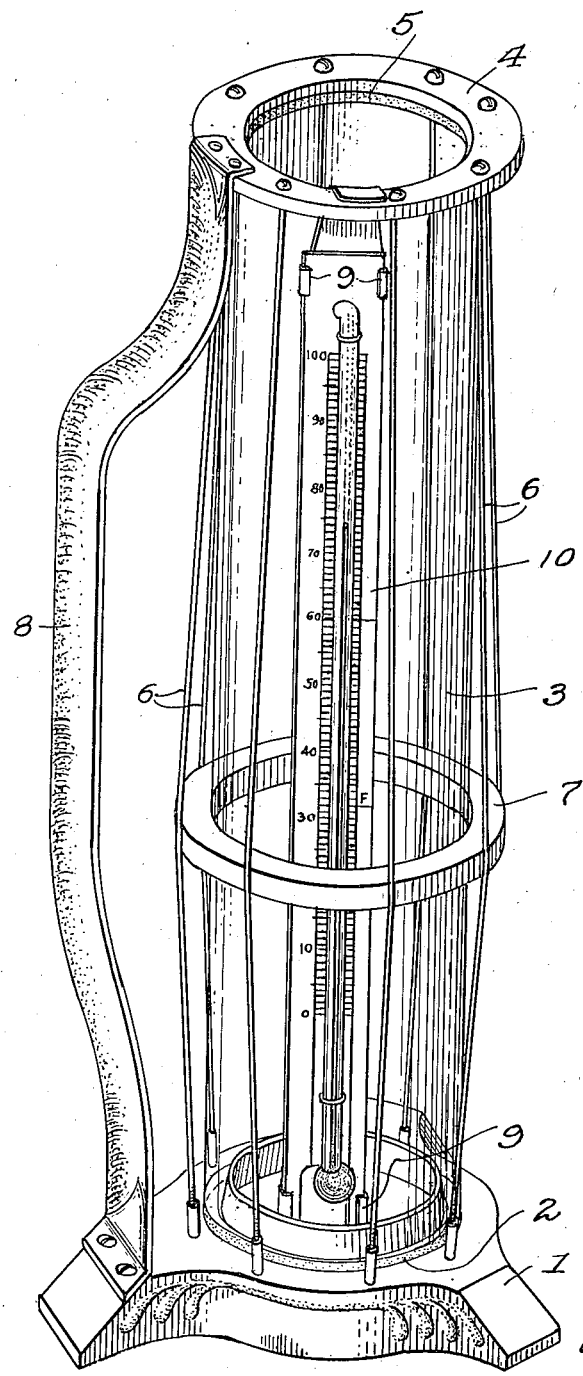
DON W. GRIFFIN
INVENTOR
BY J. F. Motherhead
ATTORNEY Patented Mar. 3, 1942

2,274,689

UNITED STATES PATENT OFFICE 2,274,689

HYDROMETRIC GAUGING CUP

Don W. Griffin, Severna Park, Md.

Application October 23, 1940, Serial No. 362,355

3 Claims. (Cl. 265—44)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

My invention relates to hydrometric gauging cups, and more particularly to that type of cup used in determining the proof of distilled spirits. The gauging cup heretofore in use by the Alcohol Tax Unit of the Bureau of Internal Revenue, United States Treasury Department, in determining the proof of distilled spirits consists of a copper cylinder approximately 1⅝ inches in diameter and 8 inches in height, soldered to a flat base approximately twice the diameter of the cylinder. A small handle in the form of a flat strip of copper bent to form a hand grip is soldered at its two ends to the copper cylinder slightly above the middle. At 90 degrees around the periphery of the cylinder from the handle is a thermometer well open into the cylinder and extending from the top to the bottom thereof with a cross-sectional area ½ square inch. One side of the thermometer well is transparent from the top to the bottom, being formed of a glass strip cemented in slots provided therefor. One-quarter inch behind the glass strip, that is, between the glass and the opening into the cylinder, is located a thermometer the scale of which is carried in grooves in the wall of the thermometer well.

The spirits reaching the thermometer bulb flow from the cylinder through an aperture in the thermometer scale at the bulb and rise in the space between the thermometer and the glass front. This thin column of spirits separated from the balance of the spirits in the main cylinder by the thermometer scale is surrounded on three sides by metal and is therefore subject to rapid temperature change by conduction from the metal. I have found that the temperature of this thin column of spirits may vary as much as 3° F. from the temperature of the spirits in the main cylinder in which the hydrometer is placed. This variation in temperature is a source of error in determining the proof of the spirits and in the use of the present cup can be eliminated only by filling and emptying the cup several times from the package being gauged before making measurements thereof.

Furthermore, in order to read the hydrometer stem when used in the present cup the latter must be full to overflowing to permit reading the hydrometer scale. This, as well as the inevitable spillage caused by the filling and refilling, in addition to the actual loss of spirits, causes the gauger's hands to become numb, especially in cold weather. Further, due to the reverse meniscus at the edge of the cup and on the hydrometer stem, accurate reading of the hydrometer scale at the surface of the liquid is very difficult.

In my improved gauging cup illustrated in the drawing attached hereto, I have eliminated these objectionable features and sources of error and in addition have produced a gauging cup inexpensive as compared with previous cups.

My cup is provided with a base 1, formed out of sheet metal so that the legs thereof will readily support the cup in an upright position whether the same be resting upon a flat or curved surface such as that of a barrel. This base, preferably stamped and punched in one operation, is formed with an indentation to receive and retain a gasket 2, which in turn supports a vertical transparent tube 3 of such a height that one "thief" full will only partially fill the cup. At the upper end of the tube I provide a lip 4 preferably of metal stamped and punched to receive a gasket 5 and the upper ends of tension members 6, illustrated of a construction similar to that of 6 cylindrical wheel spokes for clamping the tube 3 and the gaskets 2 and 5 between the lip 4 and the base 1.

I also preferably provide an annular ring 7 for spacing the tension members 5 from the tube 3. This arrangement permits the mishandling of the cup without breakage of the transparent tube, since the tension members in effect act as bumpers.

Between the lip 4 and the base 1, I provide a handle 8 as shown, curved to fit the hand and permitting the retention of the hydrometer bulb between the palm of the hand and the handle when the hydrometer is removed from the cup.

Upon the lip and base in a position to one side of the handle I provide metal supports 9 which hold the thermometer and scale 10 in a position immediately adjacent the inner wall of the tube 3 so that the scale and supports protect the thermometer and bulb from contact or breakage by the hydrometer. By this construction the temperature of the liquid surrounding the hydrometer and thermometer is the same and the temperature read upon the thermometer will accurately indicate the temperature of the liquid in which the hydrometer floats without the necessity of emptying and refilling the cup as is necessary in the one at present in use.

Furthermore, my improved cup permits the retention of one "thief" full without increasing the diameter thereof over that of the standard barrel bunghole and at the same time permits accurate reading of the hydrometer scale through the transparent wall of the tube by the elimination of the errors caused by the reverse meniscus present in the use of the cups heretofore used.

In the form illustrated my cup is assembled from parts which may be standardized and made at relatively little cost, so that should breakage of any part occur that part may be replaced without replacing the entire cup.

Having thus described my invention what I claim is:

1. A hydrometric gauging cup comprising an open-ended transparent cylinder, a metallic base closing one end thereof and forming a hydrometric chamber within the cylinder, a metallic lip in the form of an annular rim mounted on the other end thereof, tension members connecting the base and rim, and means intermediate the ends of the cylinder for spacing the tension members from the transparent cylinder, whereby said tension members act as protective bumpers for said cylinder.

2. A hydrometric gauging cup comprising an open-ended transparent cylinder, a metallic base closing one end thereof and forming a hydrometric chamber within the cylinder, a metallic lip in the form of an annular rim mounted on the other end thereof, tension members connecting the base and rim, means intermediate the ends of the cylinder for spacing the tension members from the transparent cylinder, whereby said tension members act as protective bumpers for said cylinder, and a handle shaped to conform to the curvature of a hydrometer bulb connected between said lip and said base.

3. A hydrometric gauging cup comprising an open-ended transparent cylinder, a metallic base closing one end thereof and forming a hydrometric chamber within the cylinder, a metallic lip in the form of an annular rim mounted on the other end thereof, supports attached to the base and lip and extending into said chamber, and a thermometer having a stem and scale plate, the ends of which plate are engaged by said supports and maintained at substantially right angles to a plane passing through the axis of said cylinder with the thermometer disposed between said plate and cylinder, whereby said scale plate protects the stem of said thermometer from injury by a hydrometer bulb placed in said chamber.

DON W. GRIFFIN.